United States Patent [19]

Schwab et al.

[11] Patent Number: 4,834,951
[45] Date of Patent: May 30, 1989

[54] COMMON SEPARATION OF CONTAMINATING ELEMENTS FROM ELECTROLYTE SOLUTIONS OF VALUABLE METALS

[75] Inventors: Werner Schwab, Langenfeld; Ralf Kehl, Duesseldorf, both of Fed. Rep. of Germany

[73] Assignees: Yokogawa Electric Corporation, Osaka; Kanegafuchi Kagaku Kogyo Kabushiki Kaisha, Tokyo, both of Japan

[21] Appl. No.: 101,691

[22] Filed: Sep. 25, 1987

[30] Foreign Application Priority Data

Aug. 1, 1987 [DE] Fed. Rep. of Germany ....... 3725611

[51] Int. Cl.$^4$ ............................................. C22B 11/00
[52] U.S. Cl. .................................... 423/24; 423/87; 423/138; 423/99; 204/DIG. 13; 210/634; 75/97 A; 75/101 R;99; 75/101 BE
[58] Field of Search ............... 423/87, 24, 138, 99; 204/DIG. 13; 210/634; 75/97 A, 101 R, 99, 101 BE

[56] References Cited

U.S. PATENT DOCUMENTS

| | | | |
|---|---|---|---|
| 3,284,501 | 11/1966 | Swanson | 423/24 |
| 3,294,842 | 12/1966 | Swanson | 423/24 |
| 3,428,449 | 2/1969 | Swanson | 423/24 |
| 3,464,784 | 9/1969 | Swanson | 423/63 |
| 3,821,351 | 6/1974 | Lucid | 423/24 |
| 3,853,981 | 12/1974 | Hadzeriga | 423/24 |
| 3,883,634 | 5/1975 | De Schepper et al. | 423/24 |
| 3,900,551 | 8/1975 | Bardoncelli et al. | 423/81 |
| 3,936,494 | 2/1976 | Lipowski | 423/24 |
| 4,061,564 | 12/1977 | De Schepper et al. | 423/24 |
| 4,102,976 | 7/1978 | Hiemeleers et al. | 423/87 |
| 4,108,958 | 8/1978 | Kok et al. | 423/24 |
| 4,115,512 | 9/1978 | Kerfoot | 423/24 |
| 4,130,415 | 12/1978 | Nagaraj et al. | 423/24 |
| 4,166,837 | 9/1979 | Gallacher et al. | 423/24 |
| 4,194,905 | 3/1980 | Gallacher | 423/24 |
| 4,272,492 | 6/1981 | Jensen | 423/24 |
| 4,503,015 | 3/1985 | Marr et al. | 423/24 |
| 4,547,346 | 10/1985 | Guerriero et al. | 423/87 |
| 4,713,223 | 12/1987 | Hovykaas | 423/92 |
| 4,722,774 | 2/1988 | Hyatt | 75/109 |

FOREIGN PATENT DOCUMENTS

| | | |
|---|---|---|
| 106118 | 4/1984 | European Pat. Off. |
| 2210106 | 12/1972 | Fed. Rep. of Germany |
| 2603874 | 8/1976 | Fed. Rep. of Germany |
| 2614341 | 10/1976 | Fed. Rep. of Germany |
| 2615638 | 10/1976 | Fed. Rep. of Germany |
| 3423713 | 1/1985 | Fed. Rep. of Germany |

OTHER PUBLICATIONS

"J. Chem. Research", (S) 1982, pp. 90–91, Solvent Extraction of Metals by Versatohydroxamic Acid, by Vernon et al.
"Reprints of the ISEC '86, Sep. 11–16", Munich, pp. 355–362.

Primary Examiner—Robert L. Stoll
Assistant Examiner—Paige C. Harvey
Attorney, Agent, or Firm—Armstrong, Nikaido, Marmelstein, Kubovcik & Murray

[57] ABSTRACT

A process for the common or simultaneous separation of arsenic, antimony, bismuth and iron from electrolyte solutions of valuable metals by solvent extraction and subsequent recovery of the contaminating elements, which process is characterized in that aqueous mineral-acidic electrolyte solutions of valuable metals are admixed with a sparingly water soluble organic solvent containing at least one hydroxamic acid, the aqueous and organic phases are thoroughly mixed, the contaminating elements arsenic, antimony and bismuth are precipitated from the organic phase by direct sulfide precipitation, the sulfides are separated, and the extracted iron is subsequently reextracted with a water soluble iron-complexing agent into an aqueous phase and recovered.

40 Claims, 4 Drawing Sheets

COMMON SEPARATION OF CONTAMINATING ELEMENTS FROM ELECTROLYTE SOLUTIONS OF VALUABLE METALS

BACKGROUND OF THE INVENTION

1. Field of the Invention

The invention relates to a process for the common (simultaneous) separation of two or more contaminating elements from electrolyte solutions (usually a mineral acid such as sulfuric) of valuable metals by solvent extraction from the liquid phase and subsequent recovery of the contaminating elements for reutilization.

2. Statement of Related Art

Here as well as in the subsequent description and in the claims "valuable metals" are understood to mean those desirable metallic elements which are recovered from their natural sources, more particularly from their ores, by way of industrial processes and are put into use in the metallic state, if desired as alloys with other metals, excluding metals referred to herein as contaminants. In the recovery of valuable metals hydrometallurgical processes play an important role in addition to pyrometallurgical processes. Frequently the metals or metal salts contained in the ores are developed or leached with aqueous systems, and the valuable metal is recovered from such metal salt solutions by electrolysis. However, the efficiency of the electrolysis of such aqueous solutions is highly impaired by the fact that most of the valuable metals are associated with other metals in the ores. Thus, the electrolyte solutions for recovering a valuable metal nearly always contain larger or lesser amounts of contaminating elements which adversely affect the electrolytic isolation of the valuable metal or are deposited as undesired impurities together with the valuable metal. Therefore, in order to increase the purity of the electrolytically deposited valuable metals, it is desired to remove as much as possible of all contaminating elements from the valuable metal electrolyte solutions.

Isolation of the metals copper, zinc, cobalt or nickel is possible by means of electrolysis. However, aqueous solutions obtained from leaching ores containing such metals usually contain larger or lesser amounts of contaminating elements. Satisfactory processes for removing—and if possible recovering—such contaminating elements are in demand not only because thereby the quality and the quantity of the deposited valuable metals will be improved, but also because a recovery and recycling of the contaminating elements makes economic and ecological sense.

The recovery of superpure copper by pyrometallurgical refining, for example, is characterized by two process steps proceeding separately from each other. In the first step, melt metallurgical refining, relatively impure crude copper originating from smelting copper ores is precipitated from the melt ("anode furnace"). In the subsequent refining electrolysis contaminating elements are removed and in part deposited in the anode slime, while highly conductive "electrolytic copper" (up to 99.99% pure) is deposited on the cathode. The cathode blocks comprising superpure copper thus prepared may then be further processed by plastic deformation (rolling, drawing, pressing etc.).

The elements arsenic, antimony, bismuth and iron are among numerous interfering factors of the copper-refining electrolysis which are of particular relevance in the electrolyte solutions, the amounts of which increase in the course of the process. Such contaminating elements are accumulated particularly fast in strongly acidic sulfuric acid solutions, if crude ores rich in such contaminating elements are smelted and processed in the subsequent refining procedures, as is done to a growing degree. As a consequence, it also must be expected that higher concentrations of the contaminating elements arsenic, antimony, bismuth and iron occur in the copper-refining electrolyte solutions. An accumulation of the contaminating elements not only deteriorates the quality of cathodically deposited copper which will contain increasing amounts of arsenic, antimony and bismuth impurities, but also reduces the current efficiency (due to the potential jump of $Fe^{2+}$ to $Fe^{3+}$) and, thus, increases the energy expenditure for the process.

Numerous processes are known from the prior art wherein arsenic, and in a few cases also antimony, can be removed from the solutions used for the deposition. The common feature of all these processes is that as soon as a critical concentration of the contaminating elements in the electrolyte solutions is reached, more specifically at a limit of 10 g/l of arsenic, a fractional stream of the electrolyte solution is withdrawn and then subjected to a "copper-recovery electrolysis". Thereby not only the residual copper is electrolytically deposited from the solutions, but also the aforementioned contaminating elements are removed therefrom (in an ultimate stage, "liberator cells"). The relatively impure copper obtained thereby must be once more remelted and brought to desired purity prior to use. After the deposition of these elements there remain relatively high amounts of nickel in the strongly acidic sulfuric acid solutions, which upon evaporation are precipitated as crude nickel sulfate and subjected to further purification for removing contaminations by iron, arsenic and, if desired or required, antimony. The resulting concentrated waste sulfuric acid is mostly recycled into the process.

Canadian patent 1,070,504 (and corresponding German patent document 26 03 874) describes a process for removing arsenic contaminant from copper refining electrolytes wherein the aqueous electrolyte solution is contacted with an organic phase containing tributylphosphate (TBP) to extract the arsenic contained in the solution into the organic phase. This organic phase is then brought into contact with water or an aqueous alkaline solution so as to transfer the arsenic into the aqueous phase from which it is subsequently extracted.

In a process according to U.S. Pat. No. 4,115,512 an organic phase is used as extractant which contains tributylphosphate in admixture with quaternary ammonium compounds.

Tributylphosphate as well as esters of phosphonic acid, phosphonous acid, phosphinic acid and phosphinous acid are used together with organic solvents as extractants in processes according to U.S. Pat. No. 4,102,976 (and corresponding German patent document 26 14 341) and U.S. Pat. No. 4,061,564 (and corresponding German patent document 26 15 638), for removing arsenic or antimony from copper electrolyte solutions.

Arsenic is removed from electrolytes of copper refining by means of a process according to U.S. Pat. No. 4,503,015 (and corresponding European patent document 106,118) which employs organophosphorus compounds, for example trioctylphosphine oxide (TOPO), in organic solvents such as kerosene.

U.S. Pat. No. 4,547,346 (and corresponding German patent document 34 23 713) discloses another process for removing arsenic from an acidic sulfuric acid-containing copper electrolyte, wherein $C_{5-13}$ aliphatic alcohols, and preferably 2-ethyl-1-hexanol, in an organic phase are used as extractants. A large proportion of arsenic, though not the total amount thereof, is removed from the electrolyte solution in the course of six extraction cycles.

However, all of the above prior art process have various drawbacks. The reagents must be employed at high concentrations in order to accomplish an efficient extraction of the contaminating elements from the electrolyte solutions. This seems clearly apparent, for example, from German patent document 26 15 638 (claim 4 in combination with page 4, penultimate paragraph, of the description), which is equivalent to U.S. Pat. No. 4,061,564. Moreover, most of the processes require a high concentration of acid in the extraction solutions which is virtually effected by concentrating the electrolyte to increase the sulfuric acid concentration thereof from an initial 100 to 250 g/l up to about 500 g/l. At those high sulfuric acid concentrations, the organophosphorus compounds not only extract the contaminating elements from the solutions, but also deliver considerable amounts of sulfuric acid into the organic phase. Consequently, it is then necessary to provide several stages of washing whereby the extracted sulfuric acid is recovered and recirculated into the process. Furthermore, the organophosphorus extractants (and more particularly TBP) are not sufficiently stable at those high acid strengths, so that their efficiency is reduced. Additionally, in all of these processes as a supplement to improve separation of the organic phase from the inorganic phase, a modifier, mostly isodecanol, must be added to the extractant, which modifier under certain circumstances may even accelerate the decomposition of the extractant.

In addition, all the prior art processes have drawbacks related to the reextraction of the contaminating elements from the organic phase following the actual extraction procedure. Thus, according to U.S. Pat. Nos. 4,061,564 and 4,102,976 arsenic is separated from the organic phase by means of aqueous alkali solutions. However, arsenic is thereby obtained with the oxidation numbers (III) and (V). In order to obtain the desired $As_2O_3$ as the final product, pentavalent arsenic has to be additionally reduced prior to or during the reextraction, conventionally by the use of $SO_2$. Therefor, a further process step employing additional equipment and chemicals is needed.

According to U.S. Pat. No. 4,503,015 hydrochloric acid and other aqueous mineral acids are used for reextracting arsenic. It is only by strictly controlling the chloride content in the reextraction that $Cl^-$ can be prevented from getting into the refining electrolyte and thereby undesirably deteriorating the copper refining procedure. To this end, expensive multistage cycle systems are required in practice.

The difficulties in the removal of contaminating elements from copper electrolyte solutions are encountered in a similar manner in the occurrence of contaminating elements in aqueous electrolyte solutions of other valuable metals, such as zinc or nickel. In individual cases emphasis may be laid on the removal of one definite contaminating element or on the removal of a group of such elements.

In view of the state of prior art as described there has been a great demand for a process for the common (simultaneous) separation of two or more contaminating elements from electrolyte solutions of valuable metals and the subsequent recovery of the contaminating elements for further utilization. Such process must be capable of removing at least two, preferably all of the four contaminating elements arsenic (As), antimony (Sb), bismuth (Bi) and iron (Fe) and, in addition, use simple extractants which are readily available. These extractants, moreover, should be stable under the strongly acidic conditions and conventional process temperatures encountered in the electrolyte solutions of valuable metals.

There has long been sought a solution to the problems and the disadvantages inherent to the prior art processes for removing arsenic from copper-refining solutions. Ideally, the solution will be able to remove, and to recover, the contaminating elements from the organic extract phase and thereby obtain a sulfuric acid solution free from contaminating elements which may be recirculated to the refining electrolyte without causing any problem. In such a process it should be ensured that the efficiency is not reduced by contamination of the electrolyte by impurities entrained from the preceding extraction and/or reextraction steps.

Processes for the selective extraction of individual metal ions from aqueous solutions by means of a hydroxamic acid dissolved in an organic solvent are known in the art.

In U.S. Pat. No. 3,900,551 (and corresponding German patent document 22 10 106) transition metals from partially radioactive solutions of reprocessing plants are extracted with hydroxamic acid having the general formula (A)

wherein the moieties R', R" and R'" all are alkyl. The pH is important, and the value for the aqueous recovery solution is 2 or more pH units less than the minimum pH of the organic phase.

According to U.S. Pat. No. 3,464,784, vanadium is extracted from aqueous solutions containing tetravalent vanadium by means of organosoluble hydroxamic acids having the general formula (B)

wherein R is a $C_{7-44}$ alkyl, cycloalkyl or aryl, neo-alkyl moieties being preferred which contain a quaternary carbon atom adjacent to the carbonyl.

In "J. Chem. Research" (S) 1982, pp. 90, et seq., the solvent extraction of transition metals with versatohydroxamic acids of above general formula (B) has been described wherein the moiety R is a branched $C_{10-15}$ alkyl.

The solvent extraction of various metal isotopes from aqueous solutions of reprocessing plants for radioactive residual materials by means of trialkylacetylhydroxamic acid is described in "Reprints of the ISEC '86, Sep. 11-16", Munich, pp. 355-362.

However, the common (simultaneous) removal of at least two preferably three, most preferably all of arsenic, antimony, bismuth or iron from copper electrolyte solutions has not been disclosed nor contemplated in any of the above quoted literature or patent references.

SUMMARY OF THE INVENTION

In the inventive process, the contaminated acidic electrolyte solution of a (different) valuable metal is the initial aqueous phase, and is admixed (preferably rigorously) with a solvent extraction effective amount of a sparingly water soluble organic phase comprising (preferably consisting essentially of) a sparingly water soluble organic solvent (such as a kerosene) containing at least one hydroxamic acid of the formula wherein R is a:(a) $C_{6-22}$ alkyl, (b) up to $C_{19}$ ($\cong =C_{19}$) cycloalkyl or aryl, or preferably (c) neoalkyl of the formula wherein the sum of the carbon atoms (C°) in $R^1$, $R^2$, and $R^3$ is a number or number average of from 6 to 18. As a result of the admixture, the above contaminating elements all pass into the organic phase where they are complexed with the hydroxamic acid. The electrolyte solution may then be processed to extract the valuable metal, or the solvent extraction may be repeated, each time reducing the amount of remaining contaminants in the initial aqueous phase, and the electrolyte solution then processed. The organic phase is then processed to remove the contaminating elements, which may be recovered for their own sake, and the contaminant-free organic phase may then be used to purify more electrolyte solution. Thus, after agitating the aqueous phase/organic phase sufficiently to dissolve any of the above contaminating elements into the organic phase, the two mutually insoluble phases are separated from each other. The contaminants in the organic phase other than iron are then removed by introduction of a sulfide-forming agent in a sulfide-forming effective amount, to form precipitates of arsenic sulfide, antimony sulfide, and/or bismuth sulfide. No iron sulfide is formed for reasons that will be discussed below. The precipitates are then removed from the organic phase by any simple and conventional means, such as filtration. To remove the iron from the organic phase (when it is present as an electrolyte contaminant), a water soluble iron complexing agent, or an aqueous solution thereof, is introduced to the organic phase under water soluble iron complex forming conditions and in a complexing effective amount, to form a water soluble iron complex. This water soluble iron complex is then removed from the organic phase by further solvent extraction using a second liquid phase, which may simply be added water or the water in which the water soluble iron complexing agent was dissolved.

The results of the inventive process are: first, the purification of electrolyte solution permitting obtainment of a more pure valuable metal; second, the recovery of the contaminant elements in a form in which they can readily be purified themselves, if desired; and third, the retention of the organic phase in a usable form, so that it can be recycled in a continuous or batch process.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The various trademarks referred to herein are identified as to goods and source following the examples.

The process according to the invention is based upon the concept of "solvent extraction". This term denotes processes wherein two liquid phases which are more or less immiscible or more or less mutually insoluble in each other are brought into intimate contact with each other whereby a transition of one or more components from one phase into the other phase occurs. In such a process an equilibrium state is usually realized which is dependent on various external parameters. Such parameters are described below for the individual process steps.

In the following description and in the claims the "contaminating elements" are understood to comprise at least two of the elements arsenic, antimony, bismuth and iron dissolved in aqueous electrolyte solutions, especially solutions from copper refining electrolysis. They may be present in larger or lesser concentrations, depending on the raw materials employed and smelting conditions applied, which concentrations, are at a level sufficient to contaminate the product and adversely affect the process. One or more of the contaminating elements may occur with different oxidation numbers. For example, if the contaminating element arsenic is present, it may have the oxidation numbers (III) and/or (V).

According to the invention it is preferred to remove the above contaminating elements from aqueous solutions originating from the copper-refining electrolysis. However, the process according to the invention is not restricted to the removal of contaminating elements from such solutions. It is also possible to remove one or more or even all of the four contaminating elements from aqueous solutions containing copper, zinc, nickel or other valuable metals originating from other sources or produced by other processes than electrolytic refining.

(A) The first step of the inventive process comprises adding to aqueous mineral-acidic electrolyte solutions a sparingly water soluble or water miscible organic solvent or extractant containing at least one hydroxamic acid having the general formula (I) as defined previously. Almost any solvent having the above properties is acceptable. Preferred organic solvents are high-boiling aliphatic, cycloaliphatic or aromatic hydrocarbons or mixtures thereof, chlorinated hydrocarbons, ethers having high boiling points, or mixtures of such compounds. Kerosenes or mixtures thereof are most preferred.

The hydrophobic character of the organic solvents to a wide extent determines the nature of the extractant contained in the employed solvent or of the respective extractant composition. The extractant is one or more hydroxamic acids having the general formula (I). The substituent R in general formula (I) may be a linear alkyl such as hexyl, heptyl, octyl, nonyl, decyl, undecyl, dodecyl, tridecyl, tetradecyl, pentadecyl, hexadecyl, heptadecyl, octadecyl, nonadecyl, eicosyl, uneicosyl or docosyl; or a branched chain isomer of any of the foregoing. Accordingly, in the place of the saturated alkyl moieties there may be unsaturated alkyl-derived moieties which may in turn comprise straight chains and branched chains.

Branched, saturated, $C_{6-22}$ alkyl and more preferably $C_{7-19}$ alkyl, R substituent moieties comprise the preferred hydroxamic acid extractants.

In order to comply with the demand as mentioned above of that the at least one hydroxamic acid employed as extractant should be highly soluble in the organic (extracting) solvent, and have the required stability in such solvent, it is particularly advantageous to use at least one hydroxamic acid having the general formula (I) wherein R is a neoalkyl moiety having the general formula (II)

(II)

in which the sum of the average numbers of the carbon atoms of the groups $R^1$, $R^2$ and $R^3$ is from 6 to 18, preferably 7 to 17, most preferably 8. Preferably general formula (II) is any one of neohexyl, neoheptyl, neooctyl, neononyl, neodecyl, neoundecyl, neododecyl, neotridecyl, neotetradecyl, neopentadecyl, neohexadecyl, neoheptadecyl, neooctadecyl, or neononadecyl, or their isomers. The individual identifications of the moieties $R^1$, $R^2$ and $R^3$ are of minor importance in this context, as long as each of such moieties has at least one carbon atom, so that the choice of isomer is of lesser importance. Those neoalkyl groups provide and ensure optimum solubility and stability of the hydroxamic acids having the general formula (I) in the organic extraction solvent.

The hydroxamic of the general formula (I) may be prepared by processes generally known from prior art. Thus, for example, according to U.S. Pat. No. 3,900,551 the corresponding carboxylic acid may be reacted with an excess of $SOCl_2$ to form the corresponding acid chloride which in turn is converted into the hydroxamic acid having the general formula (I) by means of hydroxylamine. Accordingly it is also possible [cf. J. Chem. Research (S) 1982, 90] to convert the carboxylic acid into its alkyl ester, followed by the reaction thereof with hydroxylamine to form the corresponding hydroxamic acid having the general formula (I). Likewise, other processes known from the prior art may be used for the preparation of such compounds.

Such hydroxamic acids (I) may be prepared according to the above processes from saturated synthetic tertiary monocarboxylic acids sold under the trademark "Versatic". They contain in a molecule having the general formula (I), in one case, at the position designated by R, a neoalkyl group having the general formula (II) in which the sum of the number of carbon atoms of the groups $R^1$, $R^2$ and $R^3$ is 8, and in another case from 7 to 17. Products of these types are commercially produced mixtures comprising hydroxamic acids of various chain lengths. They may be used in an extracting reagent which has optimum properties for the intended applications, i.e. which is not only highly soluble and stable in the organic phase, but which to an optimum degree may also be reversibly loaded with the above-identified contaminating elements. Moreover, such hydroxamic acids are extremely stable under the pH range conditions usual in such electrolyte solutions of valuable metals, while, at room temperature as well as in the range of elevated temperatures, they do not extract any free mineral acid, and more specifically no sulfuric acid, from copper electrolyte solutions. Furthermore, organic phases containing such hydroxamic acids exhibit a viscosity within a range which ensures an optimum separation of the phases after the mixing procedure as explained hereinafter. Thus, problems of separating the organic phase from the aqueous phase are avoided.

(B) The second step of the inventive process comprises thoroughly mixing the aqueous and organic phases to be contacted for a sufficient period of time to dissolve the metal contaminants into the organic phase. The period of contacting is one of the parameters upon which the extracted amount of contaminating elements, and more particularly the extracted amount of arsenic depends. At a predetermined reagent concentration as specified in detail below, after a short time of contact (3 to 5 minutes) virtually the major amount of the contaminating elements antimony, bismuth and iron is extracted. However, the relative amount of arsenic absorbed into the organic phase is distinctly lower. This is due to the fact that in typical electrolyte solutions, more particularly those of copper refining, (whose compositions will vary with the quality and preparation of the crude copper anodes), only low amounts of antimony, bismuth and iron are contained (about 0.1 to 0.6 g/l of each), whereas the amounts of arsenic are distinctly higher (from about 8 g/l to in excess of 20 g/l). If as much arsenic as possible is to be extracted—which is desired—then the contact period must be extended accordingly and/or the extractant concentration in the organic phase must be increased accordingly. For utilization of the maximum loading capacity of the hydroxamic acids having the general formula (I), the aqueous phase and the organic phase are thoroughly mixed preferably for a period of from 1 to 60 minutes, and more preferably for a period of from 10 to 20 minutes. After this period of time a major portion of the arsenic contained in the copper electrolyte solutions has also passed over into the organic phase.

Another parameter significant to the extracted amount of the contaminating elements is the concentration of the at least one hydroxamic acid. The amount of extractant in the organic phase is limited by the phenomenon that at high concentrations of the at least one hydroxamic acid in the organic phase during the procedure of loading with the contaminating elements, the viscosity of the organic phase increases to such an extent that in a continuous mode of operation efficient mixing of the two phases is no longer ensured. Moreover, separation of the organic phase from the aqueous phase becomes substantially more difficult with increasing viscosity. Therefore, in the process according to the invention it is preferred to employ solvents such as kerosenes or similar petroleum distillates or mixtures thereof which contain at least one hydroxamic acid in a solvent extraction effective amount, preferably at a concentration of 0.1 to 2.0 mol/l, most preferably 0.5 to 1.0 mol/1, in the organic phase.

The temperature at which the two phases are contacted with each other is usually a solvent extraction effective temperature, preferably 20° C. to 70° C., more preferably 30° C. to 60° C. Electrolyte solutions withdrawn from electrolysis processes have temperatures ranging from 50° C. to 70° C. due to the process operation conditions. Thus, in a continuous procedure a separate warming of the mixtures in the mixer is not required. Both of the phases are thoroughly mixed at a temperature in the above range. This may be effected in various ways, preferably by feeding the liquids to a "mixer-settler", mixing them at the temperature as indicated for the period of time as indicated and allowing them to separate in the settler.

(C) In a subsequent process step the organic phase containing the at least one hydroxamic acid and the extracted contaminating elements are separated from the aqueous phase, in any conventional manner.

(D) The next step of the inventive process comprises converting all contaminating elements other than iron to their respective sulfides by the introduction of a sulfide-forming agent in a sulfide-forming effective amount. This may preferably be effected by the introduction of a hydrogen sulfide or an alkali metal sulfide, as discussed below. In the inventive process it is important that the extraction of the contaminating elements from electrolyte solutions of valuable metals is effected at a low pH with very high concentrations of mineral acid (e.g. 150 to 250 g/l of $H_2SO_4$). Thus, a further increase of the acid concentration, as would be conventionally employed for reextraction of the contaminating elements, is beyond consideration for separation of the contaminating elements from such highly acidic solutions. Moreover, conventional reextraction of the contaminating elements by treating the organic phase with alkaline solutions also cannot be effected, as the hydroxamic acids are increasingly unstable with increasing alkalinity. Thus, in the inventive process, the sulfide precipitation of the contaminating elements, directly carried out with the loaded organic phase in a simple and surprising manner, avoids the very undesirable reextraction of the contaminating elements from the organic phase by treatment using strongly acidic or strongly alkaline aqueous solutions.

Suitable agents for formation of the sulfides are hydrogen suflide ($H_2S$) gas, an alkali metal sulfide (particularly anhydrous sodium sulfide), or their mixture. Hydrogen sulfide is most preferred, as it is particularly well suited for the precipitating step, simultaneously serving two functions. First, $H_2S$ acts as the reagent for precipitating arsenic, antimony and/or bismuth from the organic phase; second, (due to its acidic properties) it regenerates the hydroxamic acid extracting reagent.

When directly precipitating the sulfides from the organic phase using hydrogen sulfide, important controlling process parameters are (1) the hydrogen sulfide pressure, (2) the temperature during the precipitation procedure, and (3) the reaction time, although each such parameter may be varied. For completing the precipitation of the sulfides of the contaminating elements, it is sufficient to add a stoichiometric amount or a slight excess over a stoichiometric amount of gaseous hydrogen sulfide. This is effected by introducing $H_2S$ in a predetermined amount calculated in response to the amounts of contaminating elements in the electrolyte and pressurizing the reaction system with an inert gas, e.g. with $N_2$ (1 to 3 bar). It is preferred in the course of the precipitating step to adjust the $H_2S$ pressure to 1 to 50 bar, more preferably 1 to 10 bar, most preferably to 1 to 3 bar. An elevated $H_2S$ pressure positively affects the precipitation, particularly of arsenic sulfide. If a small elevated pressure (of 1 to 3 bar) is applied, the precipitation reaction may be carried out in a suitable glass vessel, thus avoiding the use of expensive metal autoclaves. If higher pressures (of 4 bar to 50 bar) are desired to be applied, then it is generally necessary to use an autoclave. However, it is considered to be an advantage that a use of highly corrosion-resistant and, hence, expensive autoclave materials (e.g. "Hasteloy" steels, products of Union Carbide) is unnecessary, since autoclaves made of conventional steels (for example V4A steels) may be employed. There is a pressure drop during the precipitation reaction, as shown below in table 7. The pressures referred to above, are always the initial $H_2S$ pressure.

The completion of the precipitation is also influenced by the second parameter, namely the temperature. The temperature may be from room (ambient) temperature up to 100° C. However at higher reaction temperatures, preferably between 40° C. and 90° C., more preferably 60° C. to 90° C., most preferably 75° C. to 85° C., a complete precipitation of the sulfides of the contaminating elements arsenic, antimony and bismuth from the organic phase is accomplished.

The third process parameter, the period of reaction, is also of importance for the completion of the precipitation. The reaction time substantially conforms to the residence time of the organic phase in the reaction vessel while $H_2S$ is introduced. The period of time for the reaction has to be adjusted in accordance with the other two mentioned parameters and is from 1 to 65 minutes, preferably 5 to 25 minutes, most preferably 15 to 25 minutes. It must be appreciated (as can be seen from below Table 7), that precipitation of bismuth sulfide is easiest and most unaffected by variation of these parameters, precipitation of antimony sulfide is only slightly affected, and precipitation of the arsenic sulfides is most affected.

The adaptation to each other of the mutually interacting parameters may be accomplished by a few simple experiments performable by anyone of ordinary skill in the art. For example, in the practice of the inventive process it has proven to be suitable to operate under 2 bar of $H_2S$ pressure at a temperature of the loaded organic phase of 80° C. when hydrogen sulfide is introduced and a period of reaction of 15 minutes. Under these reaction conditions the contaminating elements antimony and bismuth are precipitated in amounts of 100% each, and arsenic is precipitated to a large part (80% and more). In order to achieve a complete precipitation of arsenic, if desired, a further increase in pressure or an extended period of reaction may be required.

(E) Upon introduction of $H_2S$ or an alkali metal sulfide into the organic phase, the contaminating elements arsenic, antimony and/or bismuth are precipitated as sulfides and, once the precipitation has been completed, may be separated from the organic phase by any known methods. Usually this is done simply by filtering the organic phase through a filter of suitable size or by centrifuging. However, it is also possible to allow the resultant sulfide precipitates of arsenic, antimony and bismuth to settle in the reaction medium and to decant the supernatant organic phase. Which way is chosen depends on the consistency of the formed sulfide precipitates and other process parameters and is of no critical influence on the completeness of the recovery of the contaminating elements. For removing any residual organic components from the precipitated sulfides it is possible to wash the sulfides with an optional organic solvent, such as hydrocarbons of the types mentioned above or other solvents suitable for such washing purposes such as acetone, volatile esters and the like. Thereby a complete separation of organic components from the filter cake may be effected. It is believed that iron sulfides are not formed because they are soluble in acid solutions and therefore remain in solution as complexes with the inventive hydroxamic acids.

When iron is present, and is therefore to be removed, it is advantageous first to remove all of the $H_2S$ dissolved in the organic phase. Therefore, it is particularly advantageous to treat the filter cake and the organic phase with an acid, preferably a mineral acid such as sulfuric acid, after the filtration of the precipitated sulfides and prior to the above-described step of washing with an organic solvent. The treatment may be effected by contacting the filter cake and the organic phase with the mineral acid in a closed vessel with thorough mixing. A continuous mode of operation of this washing step is possible, the employed mineral acid being recirculated and made available for the purification step of subsequent batches.

(F) As has already been stated above, the iron is conveyed into the organic phase from the electrolyte solution of the valuable metal as a complex of the at least one hydroxamic acid, under the above conditions. Reextraction of iron by treating the organic phase with basic aqueous solutions, as is conventional in the art, is not possible because of the low alkaline stability of the hydroxamic acid extractants. A removal of iron from the organic phase, if desired, is effected according to the invention by adding a water soluble complexing agent for iron or an aqueous solution of such a complexing agent to the organic phase after the removal of the sulfides of the other contaminating elements and the removal of unreacted hydrogen sulfide therefrom. It is believed that any water soluble complexing agent that has a stronger affinity for iron than the inventive hydroxamic acids may be effective. Preferred water soluble complexing agents for iron are at least one of hydrogen chloride, oxalic acid or organophosphorus acids, more specifically hydroxyethanediphosphonic acid (HEDP), all of which are complexing agents known to have a high affinity toward iron. Among these, either oxalic acid or hydrogen chloride are particularly preferred.

The removal of iron, in the form of an inorganic chlorocomplex or an oxalate or a phosphonate, respectively, depends on (1) the concentration of the complexing agent to the organic phase or—upon addition of an aqueous solution of the complexing agent—in the aqueous phase, (2) the duration of the treatment of the organic phase with the complexing agent or its aqueous solution. Such process parameters, like similar process parameters discussed above, are mutually interdependent. In practice, a concentration of the water soluble complexing agent for iron in the total organic phase and any added water of 0.1 to 2 mol/l, preferably 0.5 to 1 mol/l, has been shown to be advantageous. A continuous mode of operation of the iron-complexing step may be employed which is preferably carried out in a mixer-settler. At the above concentrations of complexing agent required contact times are minimally an iron complex forming effective time, preferably 1 to 20 minutes, most preferably 5 to 15 minutes at an iron complex forming effective temperature. The above specific treatment periods are applicable when the complexing step is carried out at room temperature. They may be accordingly reduced, if the temperature is increased. It is particularly preferred to treat the organic phase with 1 mol/l of oxalic acid or HEDP, in the organic or aqueous phase, in a mixer-settler for a treatment time of 15 minutes. In such a treatment, the iron content in an organic phase having passed the sulfide-precipitation step and thereafter still containing, for example, 0.6 g/l of iron can be reduced to 0.07 g/l, i.e. to nearly one tenth.

(G) If the complexing agent is directly added to the organic phase, the water soluble iron complex newly formed is reextracted with water from the organic phase by a further solvent extraction step. To this end, the organic phase is intimately contacted with a sufficient amount of water, whereupon due to the good water solubility of the iron complex, a complete transition thereof from the organic phase into the aqueous phase takes place. If aqueous solutions of the complexing agents are added, these solutions, upon intimate mixing and subsequent separation of the phases, contain nearly all of the iron extracted from the electrolyte solutions. If desired, the iron may be recovered from the aqueous phase in a known manner.

If hydrogen chloride is used as the water soluble complexing agent, the iron contained in the organic phase is completely converted into an inorganic chlorocomplex. In order to enable recycling the organic phase and the at least one hydroxamic acid contained therein and, thus, provide them for a new extraction cycle, it is indispensable to rid the organic phase substantially, if not completely, of hydrogen chloride and/or free chloride ions. To this end, after converting the iron dissolved in the organic phase into an anionic complex form by addition of a sufficient amount of hydrogen chloride, the organic phase is again extracted using a secondary amine as a liquid ion exchanger, for example an ion exchanger obtainable under the trademark "Amberlite" LA2. The iron extracted thereby may be in turn reextracted with water. Then the organic phase is washed until chloride free in order to render it and the at least one hydroxamic acid contained therein suitable for renewed use in the extraction cycle. One or two cycles of washing with water cause a reduction of the chloride content in the organic phase to below 50 ppm, and upon controlled use of the introduced hydrogen chloride even to below 30 ppm. It is preferred that the chloride content in the organic phase is reduced to a few ppm.

(H) Thereafter, if desired, the resulting organic phase containing the hydroxamic acid may be directly reused for the extraction of the contaminating elements, with repetition of the entire process, in either a continuous or a batch operation.

Apart from adding gaseous hydrogen chloride, the removal of iron also may be effected by treating the organic phase with aqueous hydrochloric (muriatic) acid. In practice, the use of 1 to 12M HCl, preferably 3 to 8M HCl, has proven to be useful. With a view to the concentration of hydrogen chloride, it must be ascertained that the amount of the chloride ions considered to be the water soluble complexing agent is within the range set forth above, i.e. is from 0.1 to 2 mol/l of complexing agent in the organic phase. Thereby it is ensured that the total amount of iron will be converted into the form of an inorganic chlorocomplex. Upon addition of water, such complex will be removed from the organic phase together with the aqueous inorganic phase and contains all of the iron as previously extracted with the organic phase.

It also has proven to be very beneficial that the at least one hydroxamic acid does not extract any significant amount of free hydrochloric acid (as has already been mentioned above with respect to $H_2SO_4$). Moreover, in the reextraction of the iron in the form of a chloro-complex, no sparingly soluble chloride salts should be formed which are not removable by treating the organic phase with water.

In a preferred embodiment, the process step of complexing iron may also be included in the step of precipitating the contaminating elements arsenic, antimony and bismuth as sulfides from the loaded organic phase. In this instance the corresponding reextracting agents are charged together with the organic phase into the precipitation vessel, which should preferably be an autoclave when hydrogen sulfide under high pressure is to be introduced. Then the precipitation reaction will just proceed as above described. The elements arsenic, antimony and bismuth are precipitated in the form of sparingly soluble sulfides, while in this case iron before, after, or preferably at the same time is conveyed into the employed reextraction medium (aqueous complex-forming phase). When hydrogen chloride is to be used as the reextraction medium, contrary to the separate isolation of the iron complexes, the use of a corrosion resistant autoclave is required, since hydrogen chloride itself attacks less corrosion resistant steels.

In another embodiment, the process step of the iron reextraction may as well be carried out prior to the sulfide precipitation. If, for example, aqueous HCl is employed as a complexing agent for the iron, the reextracted iron-containing phase will contain additional amounts of antimony and a small amount of arsenic. This means that iron may not be readily extracted from the obtained aqueous chloridic phase i.e. without a separation from antimony and arsenic. It is for this reason that the procedure as first described, namely the sequence of: precipitation of sulfides—separation of sulfides—subsequent or common iron extraction or reextraction—is preferred.

The original aqueous phase remaining after the removal of the contaminating elements can be reprocessed by known methods. In the case of copper electrolyte solutions, further processing may comprise (depending on the ores employed for copper smelting) removing further contaminating elements, such as nickel. The resultant organic phase is to be strictly monitored in order to ensure that it consists essentially of only the employed solvent(s) or extraction carriers and the extractants, i.e. one or more of the hydroxamic acids having the general formula (I) as above defined. Only then is the obtained organic phase suitable for reuse in the extraction cycle. If desired or required, it may be replenished by adding appropriate amounts of extractant, i.e. one or more of the disclosed hydroxamic acids. Thereafter it is recirculated directly into the extraction stage. Such procedure may be carried out in a continuous mode of operation by continuously withdrawing a definite percentage of the copper refining electrolyte solution for the electrolyte device and subjecting it to the steps of purification as above described. However, it is also possible to employ a discontinuous or batch mode of operation by withdrawing minor partial amounts of the copper refining electrolyte solution and collecting the organic phase loaded with the contaminating elements in a reservoir. The collected batches of the loaded organic phases are then subjected to the abovedescribed steps of precipitation and reextraction.

The sparingly soluble sulfide precipitates of arsenic, antimony and bismuth recovered from the sulfide precipitation—depending on the starting material employed for smelting the raw ores, generally contain greater amounts of arsenic sulfide and smaller amounts of antimony sulfide and/or bismuth sulfide. A typical composition of the sulfide filter cake is about 43.5% As; about 49.0% S; about 3% Sb; and about 0.2% Bi. Those elements which are of interest for certain technical applications (e.g. As and Sb for the electronics industry) may be recovered from such filter cakes by known methods, for example by melt-metallurgical and/or hydrometallurgical recovery procedures.

In addition, it is common that iron, once separated, is also recovered from the reextraction solutions. This is also done in accordance with known methods, mostly via a hydrometallurgical recovery procedure.

If copper refining electrolyte solutions are to be treated, in most of the possible applications of the process according to the invention all of the process steps as set forth are conducted. However, in the course of the treatment procedure of electrolyte solutions from the recovery of copper as well as of other valuable metals it is also possible (and with respect to the requirements of practice meaningful as well) to skip one or more individual process steps. For example, this may be necessary or desirable, if the ore raw materials used for smelting the valuable metal fail to contain certain contaminating elements such as iron or if a removal of iron from the extraction solution is not necessary as the amount thereof is too small. Thus, the process according to the invention has the advantage of being adjustable to all problems posed to a user and adaptable to respective practical requirements.

As a further advantage of the inventive process over known processes it should be noted that the hydroxamic acids employed for extracting the contaminating elements from the electrolyte solutions are highly soluble in those solvents which are preferred to be used in processes of liquid/liquid extraction (solvent extraction). A high load of organic phase with the contaminating elements is achieved at a comparably low concentration of inventive hydroxamic acids, while the viscosity of the organic phase is not increased to reach a critical value. This results in an optimum separation of the organic phase from the aqueous phase. Such contaminating elements may be entirely extracted in a single process step.

Furthermore, a modifier as known from the prior art (such as tridecanol or nonylphenol) is not required in the process according to the invention. The inventive hydroxamic acids do not extract any acid from the electrolyte solution and, moreover, are absolutely stable at a high acid concentration of the initial electrolytes and at the process conditions as variable over a wide range.

It is another advantage of the process according to the invention that the contaminating elements arsenic, antimony and bismuth—by precipitation as sulfides—and the contaminating element iron—by formation of a complex—can be directly removed from the organic extraction phase, so that the latter can be readily recycled to a new extraction operation. The hydroxamic acids used as extractants are also readily compatible with the reagents used for the precipitation and complexing reactions.

Considering the overall process according to the invention, it must be considered a particular advantage that it can be accomplished in a small number of process steps, thus affording great flexibility to process variants occasioned by differing starting materials, available reagents, available processing apparatus, and the like.

The high efficiencies of the respective steps of extraction, precipitation and reextraction and the option to combine the process steps in various sequences render the process according to the invention suitable for being adapted to various requirements of the potential users. The known prior art processes for the removal of contaminating elements from electrolyte solutions from copper refining solutions, totally fail to provide such a high degree of flexibility.

The invention may be further illustrated by the following examples.

EXAMPLE 1

Using the inventive process the continuous extraction of the contaminating elements from an electrolyte solution obtained from a copper refining electrolysis was conducted in a mixer-settler. Because of the composition of the starting copper refining electrolyte solution (in g/l: 10.4 As, 0.028 Bi, 0.32 Sb, 0.28 Fe, 54.3 Cu, 9.6 Ni and 153.0 $H_2SO_4$) and the parameters relevant to the process steps as described above, only a small number of extraction steps were required.

As the organic solvent (extraction solvent) there was employed kerosene available under the trademark "Escaid" 100. The employed hydroxamic acid had been prepared from a mixture of carboxylic acids of the formula wherein the sum of the number of carbon atoms of the substituents $R^1$, $R^2$ and $R^3$ was between 7 and 17 (sold under the trademark "Versatic" 1019). The extractant concentration in the organic phase was 0.5 mol/l.

An extraction of the four contaminating elements As, Sb, Bi and Fe was carried out with a residence time of 15 minutes, by agitation in a media comprising a weight ratio of organic phase: aqueous phase (O/A) of 1:1.

After the separation of the organic phase from the aqueous electrolyte phase, all contaminant elements except iron were precipitated with $H_2S$ directly from the organic phase and then separated by filtration.

The iron contaminant was complexed from the organic phase with aqueous oxalic acid (concentration: 1 mol/l). The iron content was reduced from an initial level of 0.6 g/l of Fe in the organic phase to 0.07 g/l of Fe, at a residence time of 15 min and a O/A ratio of 1:1 by two extraction steps.

The copper was recovered in a highly pure state without losses by recovery electrolysis from the residual strongly acidic, sulfuric acid-containing solution, and nickel was precipitated as usual as sulfate and subjected to a separate work-up.

EXAMPLE 2

In accordance with the procedure of Example 1, electrolyte solutions from a copper refining electrolysis process were subjected to extraction tests. The conditions were as shown in following Table 1, the results of the extractions were as shown in following Tables 2A and 2B.

TABLE 1

| Example | 2a | 2b | 2c | 2d |
|---|---|---|---|---|
| electrolyte composition (g/l) | Cu:32, Ni:19.5, Fe:0.52, Bi:0.03, Sb:0.49, As:21.5 | Cu:34.4, Ni:21.5, Fe:0.5, Bi:0.03, Sb:0.49, As:19.7 | as per 2a | as per 2b |
| temperature | ambient | 5° C. | ambient | 55° C. |
| extractant: hydroxamic acid formula II sum $R^1$, $R^2$, $R^3$ = | 7 to 17[(1)] | 7 to 17[(1)] | 8[(2)] | 8[(2)] |
| organic solvent | kerosene[(3)] | kerosene[(3)] | kerosene[(3)] | kerosene[(3)] |
| O/A ratio | 1:1 | 1:1 | 1:1 | 1:1 |
| agitating contact time | 15 min. | 15 min. | 15 min. | 15 min. |

TABLE 1-continued

| Example | 2a | 2b | 2c | 2d |
| --- | --- | --- | --- | --- |
| sulfuric acid concentration | 225 g/l | 225 g/l | 225 g/l | 225 g/l | notes:
from [1]"Versatic Acid "1019
from [2]"Versatic Acid "10
[3]"Escaid "100

Table 2

| Results of extraction tests - Examples 2a, 2b | | | | | | | | | |
| --- | --- | --- | --- | --- | --- | --- | --- | --- | --- |
| Hydroxamic acid conc. (mols) | Extracted Contaminant Elements | Example 2a | | | | Example 2b | | | |
| | | Fe | Bi | Sb | As | Fe | Bi | Sb | As |
| 0.1 | (g/l) | 0.16 | v | 0.10 | 1.42 | 0.01 | v | 0.30 | 1.63 |
| | (%) | 31 | 100 | 20 | 7 | 2 | 100 | 61 | 8 |
| 0.5 | (g/l) | 0.30 | v | 0.26 | 7.24 | 0.26 | v | 0.50 | 7.5 |
| | (%) | 58 | 100 | 53 | 53 | 52 | 100 | 100 | 38 |
| 1.0 | (g/l) | 0.39 | v | 0.29 | 9.83 | 0.5 | v | 0.5 | 12.7 |
| | (%) | 75 | 100 | 59 | 46 | 100 | 100 | 100 | 64 |
| Results of extraction tests - Examples 2c, 2d | | | | | | | | | |
| Hydroxamic acid conc. (mols) | Extracted Contaminant Elements | Example 2c | | | | Example 2d | | | |
| | | Fe | Bi | Sb | As | Fe | Bi | Sb | As |
| 0.1 | (g/l) | 0.30 | v | 0.31 | 0.95 | 0.10 | v | 0.36 | 1.47 |
| | (%) | 58 | 100 | 69 | 5 | 20 | 100 | 73 | 8 |
| 0.25 | (g/l) | 0.38 | v | 0.32 | 4.03 | — | — | — | — |
| | (%) | 73 | 100 | 72 | 19 | — | — | — | — |
| 0.5 | (g/l) | 0.42 | v | 0.35 | 7.62 | 0.48 | v | 0.50 | 6.9 |
| | (%) | 80 | 100 | 78 | 36 | 96 | 100 | 100 | 35 |

"v" denotes complete extraction

As can be seen from the above test results, a temperature above ambient is slightly preferred (2b, 2d are generally better than 2a, 2c, respectively), and a sum of 7 to 17 carbon atoms is slightly preferred to a sum of 8 carbon atoms.

EXAMPLE 3

A contaminated electrolyte solution of the composition (in g/l): As: 16.6; Sb: 0.32; Bi: 0.04; Fe: 0.4; Cu: 32.0; Ni: 19.5; and $H_2SO_4$: 225 was subjected to extraction in accordance with the procedure indicated in Example 1 using the two hydroxamic acid derived from "Versatic" 1019 and "Versatic" 10 to extract arsenic, antimony, bismuth and iron. The further experimental condition were as follows:
Organic Solvent: Kerosene ("Escaid" 100);
O/A ratio: 1:1;
Contact (agitation) time: 15 minutes;
Temperature: Room temperature (ambient).

Figure 1:
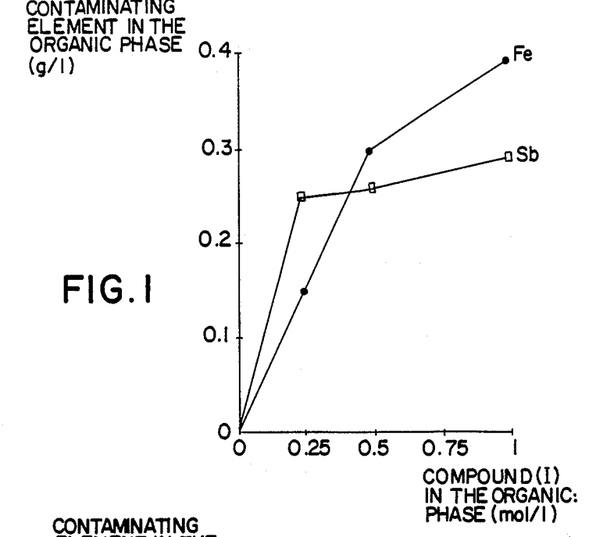
FIG. 1 is a graph depicting the extraction of iron and antimony contaminants according to the invention using the hydroxamic acid of Formula II in which the sum $R^1$, $R^2$, $R^3$ is 7 to 17, in relation to the concentration of that acid.
Figure 2:
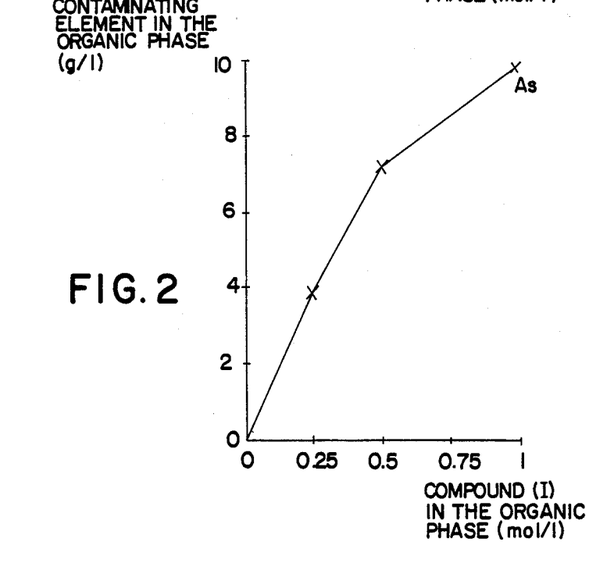
FIG. 2 is a graph depicting the extraction of arsenic contaminant according to the invention using the hydroxamic acid of Formula II in which the sum $R^1$, $R^2$, $R^3$ is 7 to 17, in relation to the concentration of that acid.
Figure 3:
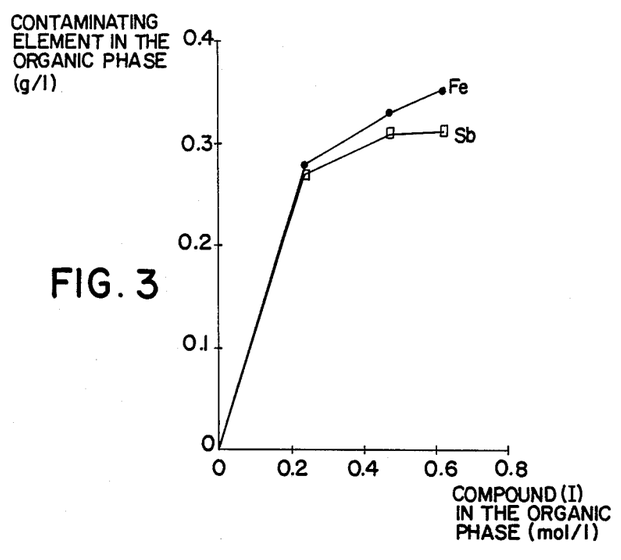
FIG. 3 is a graph depicting the extraction of iron and antimony contaminants according to the invention using the hydroxamic acid of Formula II in which the sum $R^1$, $R^2$, $R^3$ is 8, in relation to the concentration of that acid.
Figure 4:
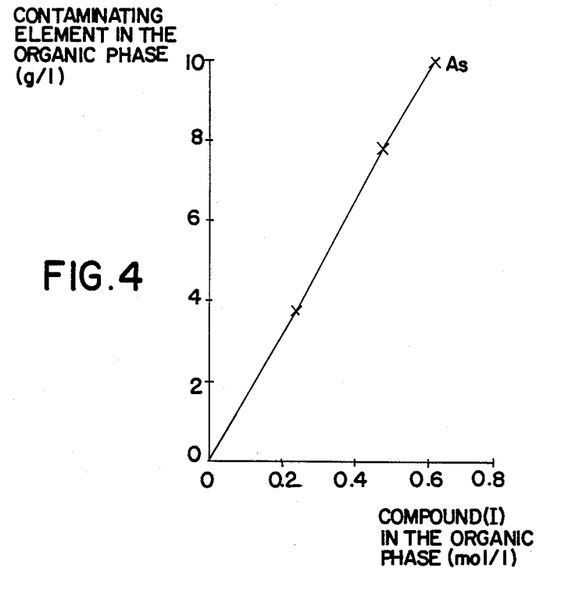
FIG. 4 is a graph depicting the extraction of arsenic contaminant according to the invention using the hydroxamic acid of Formula II in which the sum $R^1$, $R^2$, $R^3$ is 8, in relation to the concentration of that acid.

The extraction behavior of each of the hydroxamic acids is shown in FIG. 1 and FIG. 3 for the contaminating elements antimony and iron and in FIG. 2 and FIG. 4 for the contaminating element arsenic in relation to the concentrations of the respective hydroxamic acids in the organic phase.

FIG. 1 and FIG. 2 employ the hydroxamic acid obtained from "Versatic" 1019, and FIG. 3 and FIG. 4 employ the hydroxamic acid obtained from "Versatic" 10.

The Bi extraction values were omitted from the graphs with respect to the scale because the amounts of bismuth were too small. In all cases Bi is quantitatively extracted.

EXAMPLE 4

In accordance with the reaction conditions described in Example 1, a contaminated electrolyte solution whose iron, antimony, and arsenic contents are as stated in the following Table 3 and which contained the amounts of copper and nickel as specified in Example 3, was extracted with a 0.5M solution of the hydroxamic acids derived from "Versatic" 1019 in kerosene ("Escaid" 100). The O/A ratio was 1:1. The extractions were carried out at room temperature and at 60° C.

The amounts of the extracted contaminating elements iron, antimony and arsenic in relation to the period of contacting (agitation) time at different temperatures are shown in the following Table 3. The low amounts of bismuth were immediately extracted into the organic phase.

TABLE 3

Dependence of the extraction on the contacting time for 0.5 M hydroxamic acid derived from "Versatic" 1019. The initial Bi content of 0.03 g/l is completely extracted.

| Extracted Amount in g/l after min | Fe | | Sb | | As | |
| --- | --- | --- | --- | --- | --- | --- |
| | g/l | % | g/l | % | g/l | % |
| Initial Content | 0.34 | 100 | 0.33 | 100 | 12.8 | 100 |
| Room Temperature | | | | | | |
| Extracted Amount After: | | | | | | |
| 1 min | 0.22 | 65 | 0.17 | 52 | 1.21 | 9.5 |
| 3 min | 0.25 | 74 | 0.24 | 71 | 1.90 | 15 |
| 5 min | 0.30 | 88 | 0.22 | 64 | 3.14 | 25 |
| 15 min | 0.33 | 98 | 0.26 | 76 | 5.84 | 46 |
| 30 min | 0.34 | 100 | 0.29 | 87 | 6.95 | 54 |
| 60 min | 0.34 | 100 | 0.31 | 94 | 7.12 | 56 |
| 60° C. | | | | | | |
| Extracted Amount After: | | | | | | |
| 1 min | 0.29 | 85 | 0.30 | 91 | 2.06 | 16 |
| 3 min | 0.34 | 100 | 0.32 | 94 | 5.00 | 39 |
| 5 min | 0.31 | 91 | 0.28 | 82 | 6.32 | 49 |
| 15 min | 0.22 | 65 | 0.33 | 100 | 7.61 | 59 |
| 30 min | 0.27 | 79 | 0.33 | 100 | 7.68 | 60 |
| 60 min | 0.26 | 76 | 0.33 | 100 | 7.67 | 60 |

EXAMPLE 5

Figure 5:
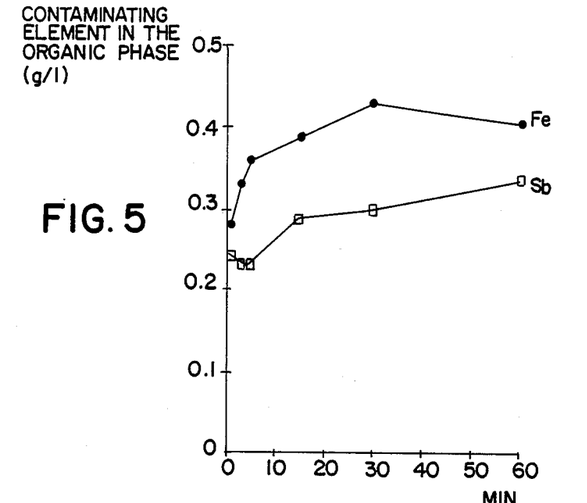
FIG. 5 is a graph depicting the extraction of iron and antimony contaminants according to the invention using the hydroxamic acid of Formula II in which the sum $R^1$, $R^2$, $R^3$ is 7 to 17, in relation to the contact (agitation) time.
Figure 6:
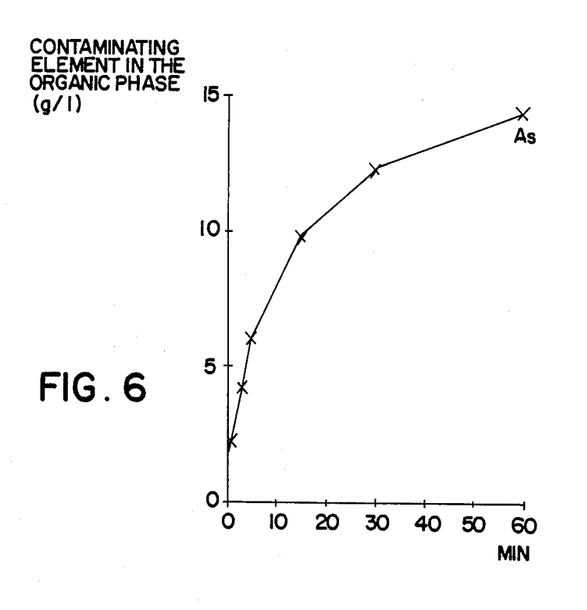
FIG. 6 is a graph depicting the extraction of arsenic contaminant according to the invention using the hydroxamic acid of Formula II in which the sum $R^1$, $R^2$, $R^3$ is 7 to 17, in relation to the contact (agitation) time.
Figure 7:
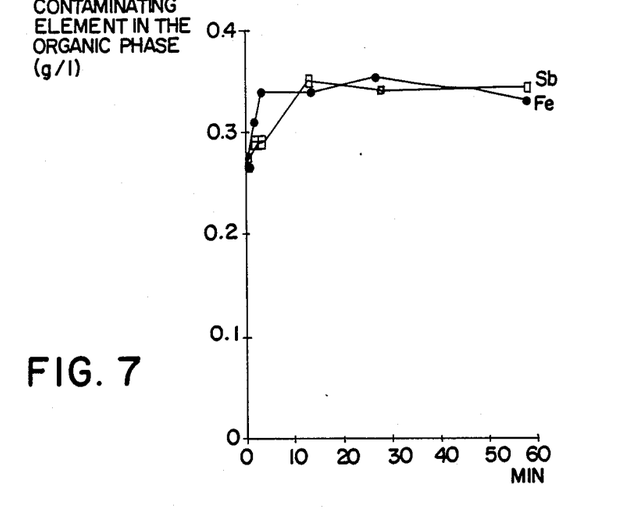
FIG. 7 is a graph depicting the extraction of iron and antimony contaminants according to the invention using the hydroxamic acid of Formula II in which the sum $R^1$, $R^2$, $R^3$ is 8, in relation to the contact (agitation) time.
Figure 8:
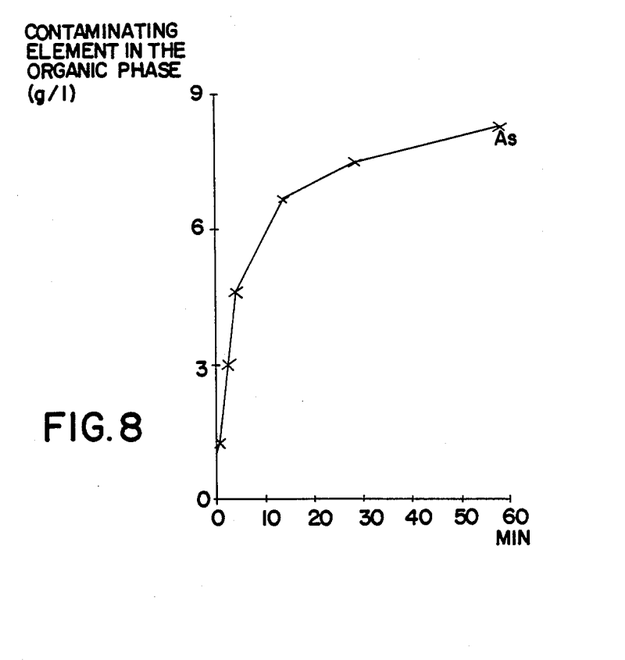
FIG. 8 is a graph depicting the extraction of arsenic contaminant according to the invention using the hydroxamic acid of Formula II in which the sum $R^1$, $R^2$, $R^3$ is 8, in relation to the contact (agitation) time.

In accordance with the procedure described in Example 3 extractions were carried out with contaminated electrolyte solutions using a 1.0M solution of the hydroxamic acids derived from "Versatic" 1019 and a 0.5M solution of the hydroxamic acids derived from "Versatic" 10. The composition of the electrolyte solutions was as in Example 3. For extractions at room temperature the extraction behavior of the respective hydroxamic acids over the course of time, which is represented by the amount of contaminating element in the organic phase given in g/l in relation to the contacting (agitation) time, is shown in FIG. 5 to FIG. 8. FIG. 5 and FIG. 6 show the behavior of the hydroxamic acids derived from "Versatic" 1019, while FIG. 7 and FIG. 8 show the bahavior of the hydroxamic acids derived from "Versatic" 10.

EXAMPLE 6

The extraction behavior of the hydroxamic acids (I) derived from "Versatic" 1019 in kerosene ("Escaid" 100) as the organic solvent (concentration: 0.5M) with respect to the extraction of arsenic (III) compared to arsenic (V) was tested with an artificial test electrolyte (arsenic contents: see the following Table 4; contents of sulfuric acid: 225 g $H_2SO_4$/l) at an O/A ratio of 1:1 and a contacting (agitation) time of 15 minutes. The results are shown in the following Table 4.

TABLE 4

As(III)/As(V) extraction with hydroxamic acids derived from "Versatic" 1019

|  | 14.6 As III | 14.1 As V |
|---|---|---|
| Initial contents (g/l) (Test electrolyte) | 14.6 As III | 14.1 As V |
| Extracted amount of As (g/l)[(1)] | 8.4 | 6.2 |
| % As extraction | 58 | 44 | note:
[(1)]determined in the organic phase

EXAMPLE 7 AND COMPARATIVE EXAMPLE 1

In accordance with the procedure described in Example 2 the extraction of arsenic from a contaminated electrolyte using hydroxamic acid derived from "Versatic" 1019 (30% in kerosene—"Escaid" 100 as the organic solvent/extraction solvent) was tested at a temperature of 50° C. and a contacting (agitation) time of 15 minutes. The results are shown in the following Table 5.

The values for the extraction of As with TBP have been taken from "A. de Schepper; MHO solvent extraction process . . . ; Extraction Metallurgy '85 Symposium; The Institution of Mining and Metallurgy".

TABLE 5

Comparison of the extraction behavior of hydroxamic acid derived from "Versatic" 1019 and TBP

| Extracting reagent | $H_2SO_4$-conc. (g/l) | As extr. (g/l) | Notes |
|---|---|---|---|
| "Versatic" 1019-derived Hydroxamic acid, 30% in kerosene ("Escaid" 100) | 180–230 | 15 | in addition complete extraction of Sb, Bi and Fe |
| TBP, 30% in kerosene ("Escaid" 100) | 490 | 4.6 | does not extract any other elements, requires an $H_2SO_4$-conc. >400 g/l |
| TBP (100%) | 490 | 15 | does not extract any other elements requires an $H_2SO_4$-conc. >400 g/l |

The comparison of the obtained values shows that—as has been set forth in detail above—the extractant according to the prior art fails to extract any contaminating element other than arsenic. Moreover, it requires a distinctly higher concentration of sulfuric acid in the electrolyte solution, which, therefore, has to be concentrated at a high expense of energy prior to the extraction. At those high sulfuric acid concentrations (near 500 g/l) the stability of the extractant TBP is no longer ensured.

EXAMPLE 8 AND COMPARATIVE EXAMPLE 2

With an aqueous solution of sulfuric acid containing 200 g/l of $H_2SO_4$, the extraction of free sulfuric acid by hydroxamic acid derived from "Versatic" 1019 (Example 8) and by tributyl phosphate (TBP; Comparative Example 2) was tested. The O/A ratio was 1:1; the contacting time was 15 minutes.

The results are shown in the following Table 6.

TABLE 6

Extraction of free $H_2SO_4$ by hydroxamic acid derived from "Versatic" 1019 and by TBP

| Extraction reagent | extr. $H_2SO_4$ at 25° C. | extr. $H_2SO_4$ at 60° C. |
|---|---|---|
| "Versatic" 1019-derived hydroxamic acid, 30% in kerosene ("Escaid" 100) | 0.26 g/l | 0.17 g/l |
| "Versatic" 1019-derived hydroxamic acid, 15% in kerosene ("Escaid" 100) | 0.14 g/l | 0.08 g/l |
| TBP | 11.0 g/l | — |

Result

As is apparent from the comparison of the extracted amounts set forth in Table 6, the extractant according to the prior art which is usually employed for the extraction in a concentrated form (e.g. 100%) absorbs considerable amounts of sulfuric acid from the aqueous phase. The respective values are higher by about a factor of $10^2$ than those found in the extractions using hydroxamic acids according to the present invention.

EXAMPLE 9

Organic phases obtained by extractions according to Examples 1 to 8 and containing the contaminating elements arsenic, antimony, bismuth and iron in addition to the extractant were subjected to the action of hydrogen sulfide gas to effect sulfide precipitation of the contaminating elements As, Sb and Bi. The sulfide precipitation tests were carried out in a heated V4A-steel autoclave, the content of which was vigorously stirred while the hydrogen sulfide gas was introduced.

The results are set forth in the following Table 7.

TABLE 7

Direct H2S-precipitation of the loaded organic hydroxamic acid phase.
(The initial contents of the individual organic phases as used were subject to minor but insignificant variations).
The asterisk * denotes a test with full utilization of autoclave volume (no empty space left)

| Temp. °C. | Initial H2S Pressure (bar) | Final H2S Pressure (bar) | Duration of Precipitation (min) | Precipitated Amount g/l | | | Precipitated Amount % | | |
|---|---|---|---|---|---|---|---|---|---|
| | | | | Sb | As | Bi | Sb | As | Bi |
| ambient | 10 | 4.4 | 60 | 0.2 | 3.2 | 0.03 | 75 | 38 | 100 |
| 60 | 1 | 1 | 60 | 0.3 | 4.0 | 0.03 | 100 | 49 | 100 |
| 70 | 10 | 7.1 | 60 | 0.3 | 8.2 | 0.03 | 100 | 100 | 100 |
| 80 | 1 | 1 | 60 | 0.3 | 5.3 | 0.03 | 100 | 65 | 100 |
| 80 | 10 | 3.2 | 20 | 0.3 | 7.1 | 0.03 | 100 | 92 | 100 |
| 80 | 10 | 5.2 | 25 | 0.3 | 7.0 | 0.03 | 100 | 97 | 100 |
| 80 | 10 | 7.0 | 15 | 0.3 | 6.9 | 0.03 | 100 | 97 | 100 |
| 80 | 10 | 10 | 25 | 0.3 | 6.9 | 0.03 | 100 | 97 | 100 |
| 80* | 2 | 2 | 15 | 0.3 | 5.0 | 0.03 | 100 | 80 | 100 |
| 80 | calc. amount of H2S (about 1 bar) | 3 bar, with N2 increased | 15 | 0.2 | 4.1 | 0.03 | 100 | 70 | 100 |

Result

The amounts of Bi (0.03 to 0.04 g/l) extracted from the aqueous electrolyte solutions were completely precipitated.

In all of the cases Fe is *not* precipitated by this procedure. Depending on the conditions applied for the precipitation (H2S pressure, duration of precipitation), the other contaminating elements could be precipitated directly from the organic phase in most cases at very high proportions, in some cases even at 100%.

EXAMPLE 10 AND COMPARATIVE EXAMPLE 3

Organic phases containing hydroxamic acids derived from "Versatic" 1019 as extractants and having been loaded with different amounts of arsenic, antimony, bismuth and iron were simultaneously treated with H2S and an aqueous iron-complexing agent in order to precipitate arsenic, antimony and bismuth as sulfides and in the same step to bind iron in the form of a water-soluble complex. The contacting times between the H2S-containing organic phase and the aqueous phase containing the iron-complexing agent ranged from 15 to 120 minutes.

The results are shown in the following Table 8.

If an aqueous sulfuric acid phase (concentration of H2SO4: 150 g/l) is used (Comparative Example 3), although an approximately complete precipitation of arsenic, antimony and bismuth is accomplished (by way of saturation with H2S), Fe is not reextractable into the aqueous phase under these conditions, as is apparent from the last line of the following Table 8.

EXAMPLE II

Described below are the results of tests for Fe reextraction by means of water soluble complexing agents or HCl.

Water Soluble Complexing Agents

Test a

After passing the direct sulfide-precipitating step, the organic phase loaded with Fe in an amount of 0.41 g/l ("Versatic" 1019-derived hydroxamic acid) in O/A ratio of 3:1 was admixed with an appropriate complexing agent, and the mixture was shaken at room temperature for 15 minutes. The following results were after discontinuous operation over three stages:
0.5M oxalic acid—yielded—80% Fe reextraction
0.5M HEDP—yielded—95% FE reextraction Test b An organic phase ("Versatic" 1019-derived hydroxamic acid) loaded with 0.3 g/l of Fe, 0.2 g/l of Sb, 0.3 g/l of Bi and 5.6 g/l of As which had not yet subjected to a direct sulfide-precipitating step, was admixed with oxalic acid at various concentration levels (test conditions: O/A ratio 1:1; shaking time 5 minutes at room temperature; one stage).

| 0.1 M oxalic acid | Fe 0.3 g/l | Sb 0.2 g/l | As 5.6 g/l |
| 0.5 M oxalic acid | Fe 0.1 g/l | Sb 0.1 g/l | As 5.6 g/l |
| 1.0 M oxalic acid | Fe <0.1 g/l | Sb 0.2 g/l | As 5.6 g/l |

TABLE 8

Combined direct sulfide precipitation and treatment with water soluble complex-forming agents or mineral acids

| Water soluble complexing agent/ mineral acid | O/A ratio | H2S-pressure (bar) | Temp. (°C.) | Duration (min) | % Precipitation | | | % Fe reextracted |
|---|---|---|---|---|---|---|---|---|
| | | | | | Sb | Bi | As | |
| 3M HCl | 1:1 | 10 | 90 | 120 | 100 | 100 | 100 | 100 |
| 3M HCl | 1:1 | 2 | 80 | 30 | 100 | 100 | 97 | 100 |
| 3M HCl | 2:1 | 10 | 60 | 60 | 100 | 100 | 98 | 100 |
| 3M HCl | 2:1 | 5 | 60 | 15 | 100 | 100 | 56 | 100 |
| 3M HCl | 4:1 | 10 | 60 | 60 | 100 | 100 | 88 | 100 |
| 1M Oxalic acid | 1:1 | 10 | 60 | 60 | 100 | 100 | 94 | 100 |
| 0.5M Oxalic acid | 1:1 | 5 | 90 | 60 | 100 | 100 | 96 | 75 |
| 0.5M HEDP | 1:1 | 10 | 60 | 60 | 100 | 100 | 90 | 100 |
| H2SO4 (150 g/l) | 1:1 | 10 | 60 | 60 | 100 | 100 | 99 | 0 |

Test c

The employed organic phases were as in Table b, however here the dependence on time of the reextraction was determined:

| Shaking time (minutes) | Fe-content in the aqueous phase (0.5 M oxalic acid) |
|---|---|
| 1 | 0.07 g/l |
| 3 | 0.19 g/l |
| 5 | 0.22 g/l |
| 15 | 0.30 g/l |

Test d

After the sulfide precipitation had been completed, an organic phase which still contained Fe was contacted with HCl of various molar concentrations. Test conditions: O/A ratio 1:1; shaking time 15 minutes; one stage; temperature as indicated.

3M HCl (Room temperature)—yielded—7% Fe reextracted

6M HCl (Room temperature)—yielded—50% Fe reextracted

3M HCl (60° C.)—yielded—13% Fe reextracted

| Identification of Trademarks Used in the Specification | | |
|---|---|---|
| Trademark | Source | Identification |
| ESCAID 100 | Esso (Exxon) Co. | a kerosene |
| AMBERLITE LA 2 | Rohm & Haas Co. | secondary amine ion exchanger |
| VERSATIC ACID | Shell Chemical Co. | saturated synthetic tertiary monocarboxylic acids |
| VERSATIC 10 | Shell Chemical Co. | saturated synthetic tertiary monocarboxylic acids wherein the sum of $R^1$, $R^2$, $R^3$ according to Formula II is 8 |
| VERSATIC 1019 | Shell Chemical Co. | saturated synthetic tertiary monocarboxylic acids wherein the sum of $R^1$, $R^2$, $R^3$ according to Formula II is 7 to 17 |

We claim:

1. A process for the separation of at least two contaminating elements selected from the group consisting of arsenic, antimony, bismuth, or iron, from a contaminated acidic electrolyte solution of a different and valuable metal selected from the group consisting of copper, nickel, zinc and cobalt comprising:

(A) admixing the contaminated electrolyte solution as an aqueous phase with a solvent extraction effective amount of an organic phase comprising:

(1) a substantially water insoluble and immiscible organic solvent, containing (2) at least one hydroxamic acid of the formula (I)

where R is a
(a) $C_{6-22}$ alkyl,
(b) $C_{19}$ cycloalkyl or aryl, or (c) neoalkyl of the formula (II)

wherein the sum of the carbon atoms in $R^1$, $R^2$, and $R^3$ is about from 6 to 18;

(B) agitating the admixture of said aqueous and organic phases for a sufficient period of time to extract any of said arsenic, antimony, bismuth and iron contaminating elements present in the aqueous phase into the organic phase;

(C) separating the organic phase now containing said contaminants, from the aqueous phase containing the valuable metal;

(D) converting the contaminant metals, other than iron, now contained in the organic phase to their respective sulfides by introduction of a sulfide-forming agent in a sulfide-forming effective amount, to form sulfide precipitates of any arsenic, antimony, and bismuth present;

(E) separating the sulfide precipitates from the organic phase;

(F) introducing, where iron has been extracted in step (B) as a contaminating element, and is present in said organic phase after step (C), a water soluble iron complexing agent which has a greater affinity for iron that said hydroxamic acid, in a complexing effective amount to form a water soluble iron complex; and (G) introducing sufficient water to dissolve the iron complex and separating the aqueous iron complex solution from the organic phase.

2. The process of claim 1 wherein iron is present as a contaminant, and steps (F) and (G) are conducted.

3. The process of claim 2 wherein steps (D) and (F) are conducted simultaneously and steps (E) and (G) are conducted in any order or simultaneously.

4. The process of claim 2 wherein steps (D) and (E) are conducted after steps (F) and (G).

5. The process of claim 1 wherein the separated contaminant elements are themselves recovered by melt-metallurgical and/or hydrometallurgical recovery procedures.

6. The process of claim 1 wherein the valuable metal in the electrolyte solution is copper.

7. The process of claim 1 wherein the source of acid for the electrolyte solution is sulfuric acid.

8. The process of claim 1 wherein said organic solvent is a kerosene.

9. The process of claim 1 wherein substituent R is a branched, saturated $C_{6-22}$ alkyl.

10. The process of claim 1 wheren substituent R is a branched, saturated, $C_{7-19}$ alkyl.

11. The process of claim 1 wherein substituent R is said neoalkyl.

12. The process of claim 1 wherein R is said neoalkyl and the sum of the C° in $R^1$, $R^2$, $R^3$ is about 7 to 17.

13. The process of claim 1 wherein R is said neoalkyl and the sum of the C° in $R^1$, $R^2$, $R^3$ is about 8.

14. The process of claim 1 wherein said at least one hydroxamic acid is present in a concentration of 0.1 to 2.0 mol/liter, based upon the total organic phase.

15. The process of claim 1 wherein said at least one hydroxamic acid is present in a concentration of 0.5 to 1.0 mol/liter, based upon the total organic phase.

16. The process of claim 1 wherein (B) is conducted for 1 to 60 minutes.

17. The process of claim 1 wherein step (B) is conducted for 10 to 20 minutes.

18. The process of claim 1 wherein step (B) is conducted at a temperature of 20° C. to 70° C.

19. The process of claim 1 wherein step (B) is conducted at a temperature of 30° C. to 60° C.

20. The process of claim 1 wherein step (B) is conducted in a mixer-settler.

21. The process of claim 1 wherein the sulfide-forming agent of step (D) is hydrogen sulfide gas or anhydrous sodium sulfide.

22. The process of claim 1 wherein the sulfide-forming agent of step (D) is hydrogen sulfide gas.

23. The process of claim 1 wherein the sulfide-forming agent of step (D) is hydrogen sulfide gas which is used in a stoichiometric amount or a slight excess over a stoichiometric amount, and the reaction system is then pressurized with an inert gas.

24. The process of claim 23 wherein step (D) is conducted at a pressure of 1 to 50 bar.

25. The process of claim 23 wherein step (D) is conducted at a pressure of 1 to 5 bar.

26. The process of claim 1 wherein step (D) is conducted at a temperature of 40° C. to 90° C.

27. The process of claim 1 wherein step (D) is conducted for 1 to 60 minutes.

28. The process of claim 1 wherein step (D) is conducted for 5 to 20 minutes.

29. The process of claim 1 wherein step (E) is conducted by filtering the organic base to form a precipitate filter cake, and washing the filter cake with a mineral acid and optionally, then an organic solvent.

30. The process of claim 2 wherein the iron complexing agent of step (F) is hydrogen chloride gas, hydrochloric acid, oxalic acid, or hydroxyethanediphosphonic acid.

31. The process of claim 2 wherein the iron complexing agent in step (F) is present in a concentration of 0.1 to 2.0 mol/liter, based upon the total organic phase and any added water.

32. The process of claim 2 wherein the iron complexing agent in step (F) is present in a concentration of 0.5 to 1.0 mol/liter, based upon the total organic phase and any added water.

33. The process of claim 2 wherein step (F) is conducted for 1 to 20 minutes.

34. The process of claim 2 wherein step (F) is conducted for 5 to 15 minutes.

35. The process of claim 2 wherein step (F) is conducted in a mixer-settler.

36. The process of claim 2 wherein the iron complexing agent of step (F) is hydrogen chloride gas or aqueous hydrogen chloride solution, and the formed iron complex is removed with an ion exchanger.

37. The process of claim 36 wherein the ion exchanger is a liquid secondary amine, and the iron is recovered therefrom by reextraction with water.

38. The process of claim 2 wherein:
   (A)
      (1) is a kerosene;
      (2) is a hydroxamic acid where R is a neoalkyl and the sum of the C° in $R^1$, $R^2$, $R^3$ is 8 or 7 to 17, and it is present in 0.1 to 2.0 mol/liter, based upon the total organic phase;
   (B) is conducted for 1 to 60 minutes at a temperature of 20° C. to 70° C., in a mixer-settler;
   (D) is conducted using hydrogen sulfide gas in a stoichiometric or slight excess over stoichiometric amount, pressurized with an inert gas to a pressure of 1 to 50 bar, and conducted at a temperature of 40° C. to 90° C. for 1 to 60 minutes;
   (E) is conducted by filtering the organic phase to form a precipitate filter cake which is then washed with a mineral acid and optionally an organic solvent; and
   (F) is conducted with an iron complexing agent which is hydrochloric acid, oxalic acid, or hydroxyethanediphosphonic acid present in a concentration of 0.1 to 2.0 mol/liter based upon the total organic phase and any added water, for a time of 1 to 20 minutes, in a mixer-settler.

39. The process of claim 2 wherein:
   (A)
      (1) is a kerosene;
      (2) is a hydroxamic acid where R is a neoalkyl and the sum of the C° in $R^1$, $R^2$, $R^3$ is about 8 or 7 to 17, and it is present in 0.5 to 1.0 mol/liter, based upon the total organic phase;
   (B) is conducted for 10 to 20 minutes to a temperature of 30° C. to 60° C., in a mixer-settler;
   (D) is conducted using hydrogen sulfide gas in a stoichiometric or slight excess over stoichiometric amount, pressurized with an inert gas to a pressure of 1 to 3 bar, and conducted at a temperature of 40° C. to 90° C. for 5 to 20 minutes;
   (E) is conducted by filtering the organic phase to form a filter cake which is then washed with a mineral acid and then with an organic solvent; and then
   (F) is conducted with an iron complexing agent which is hydrogen chloride gas or aqueous hydrogen chloride solution, and the formed iron complex is removed with an ion exchanger.

40. The process of claim 1 conducted in a continuous or batch manner by recycling at least part of the organic phase after substantially all contaminant elements present have been removed, to a new supply of contaminated acidic electrolyte solution of a valuable metal.

* * * * *

UNITED STATES PATENT AND TRADEMARK OFFICE
CERTIFICATE OF CORRECTION

PATENT NO. : 4,834,951
DATED : May 30, 1989
INVENTOR(S) : Werner Schwab; Ralf Kehl It is certified that error appears in the above-identified patent and that said Letters Patent is hereby corrected as shown below:

On the title page
The Assignee should read "Henkel Kommanditgesellschaft auf Aktien, Duesseldorf, Fed. Rep. of Germany".

At Col 25, line 35, in claim 29, "base" should read --phase--.

Signed and Sealed this

Twenty-seventh Day of March, 1990

Attest:

JEFFREY M. SAMUELS

*Attesting Officer*  *Acting Commissioner of Patents and Trademarks*